United States Patent
Lam

(10) Patent No.: US 12,461,233 B2
(45) Date of Patent: Nov. 4, 2025

(54) SYSTEM AND METHOD FOR DETECTION AND REPORTING OF EVENTS

(71) Applicant: WOVEN BY TOYOTA, INC., Tokyo (JP)

(72) Inventor: Ho Ki Wilson Lam, Tokyo (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 326 days.

(21) Appl. No.: 18/177,906

(22) Filed: Mar. 3, 2023

(65) Prior Publication Data

US 2024/0295651 A1 Sep. 5, 2024

(51) Int. Cl.
*G01S 13/931* (2020.01)
*G01S 13/86* (2006.01)
*G10L 15/08* (2006.01)

(52) U.S. Cl.
CPC ............ *G01S 13/931* (2013.01); *G01S 13/86* (2013.01); *G10L 15/08* (2013.01); *G01S 2013/9316* (2020.01); *G10L 2015/088* (2013.01)

(58) Field of Classification Search
CPC .................. G01S 13/931; G01S 13/86; G01S 2013/9316; G01S 7/003; G01S 17/931; G01S 17/88; G01S 17/93; G10L 15/08; G10L 2015/088; G10L 25/51; G08B 19/00; G08B 25/016; G06Q 50/265; H04L 67/12; H04W 4/38; H04W 4/44
See application file for complete search history.

(56) References Cited

U.S. PATENT DOCUMENTS

| | | | |
|---|---|---|---|
| 11,119,477 B1 * | 9/2021 | Konrardy | B60W 40/04 |
| 11,417,109 B1 * | 8/2022 | Theimer | G06N 3/08 |
| 11,601,542 B1 * | 3/2023 | Veloso | H04M 1/6075 |
| 2019/0193659 A1 | 6/2019 | Miyazawa et al. | |
| 2019/0279447 A1 * | 9/2019 | Ricci | B60R 25/01 |
| 2020/0175474 A1 | 6/2020 | Hamagami et al. | |
| 2020/0175788 A1 | 6/2020 | Park et al. | |
| 2021/0097784 A1 | 4/2021 | Castano et al. | |
| 2022/0103994 A1 | 3/2022 | Nagasawa | |
| 2023/0386268 A1 * | 11/2023 | Scarbrough | H04N 7/183 |

FOREIGN PATENT DOCUMENTS

| | | |
|---|---|---|
| JP | 2002-293271 A | 10/2002 |
| JP | 2009-093254 A | 4/2009 |
| JP | 2020-091525 A | 6/2020 |
| JP | 2022-053631 A | 4/2022 |
| WO | 2018/008122 A1 | 1/2018 |

* cited by examiner

*Primary Examiner* — Thomas Ingram
(74) *Attorney, Agent, or Firm* — Sughrue Mion, PLLC

(57) ABSTRACT

Provided are method, system, and device for detection and reporting of events. The method may be implemented by programmed one or more processors in a vehicle, and may include: obtaining sensor data from at least one sensor device on the vehicle; processing the obtained sensor data to determine whether a predetermined event outside of the vehicle has occurred; and based on the predetermined event being determined to have occurred, transmitting information corresponding to the predetermined event to a server.

20 Claims, 12 Drawing Sheets

| ID | Sensor Type | Location | Time | ... | Parameter |
|---|---|---|---|---|---|
| 0001 | Image | X1, Y1 | 10:00 (12/18/2022) | ... | Source: Front Camera<br>Type: RAW format<br>Size: 3 MB |
| | | X1, Y1 | 10:00 (12/18/2022) | ... | Source: Rear Camera<br>Type: JPEG format<br>Size: 3 MB |
| 0002 | Audio | X1, Y1 | 10:00 (12/18/2022) | ... | Source: Driver Seat Microphone<br>Type: MP3 (16 bit 48000 Hz)<br>Size: 4 MB |
| ... | ... | ... | ... | ... | ... |
| 000N | Sensor N | Xn, Yn | NN:NN:NN | ... | Parameter N |

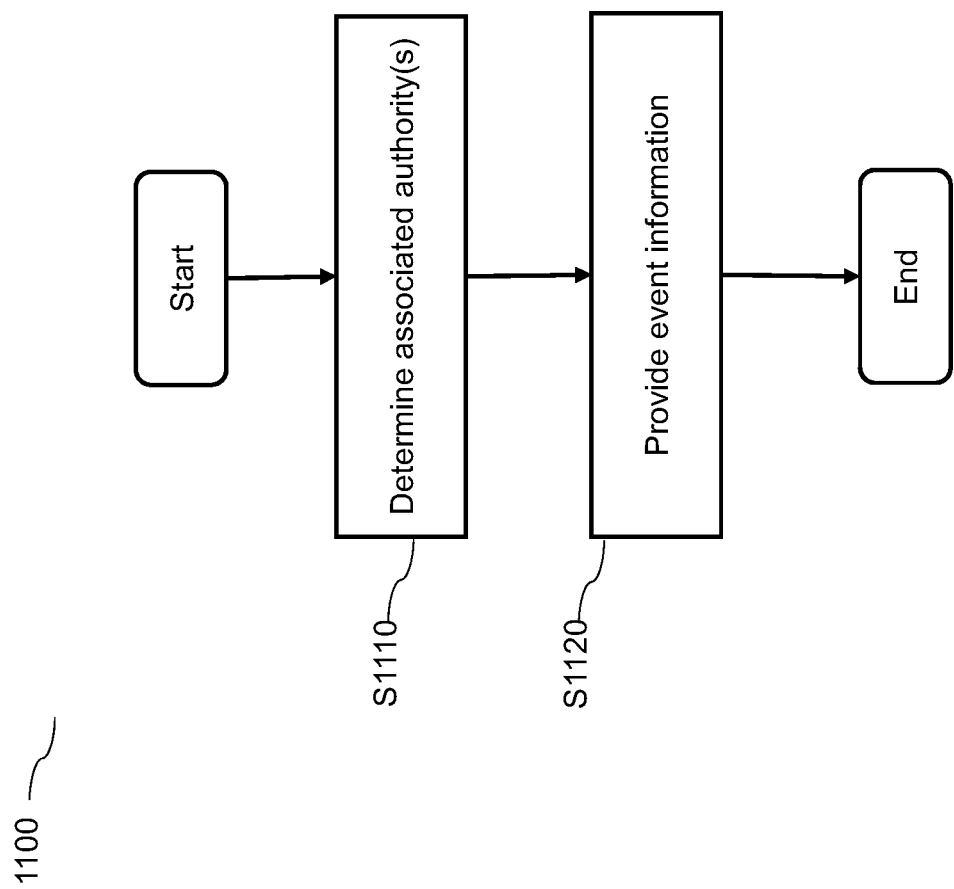

| Type | Location | Information |
|---|---|---|
| Medical or Injury | X2, Y1 | Name: XX Medical Center<br>Emergency Hotline: XXX<br>24-hours online system: URL_X<br>Type: Private |
| Illness | A1, B1 | Name: YY National Hospital<br>Emergency Hotline: YYY<br>24-hours online system: URL_Y<br>Type: Public |
| Rescue or Fire Fighting or Evacuation | X1, Y1 | Name: XY State Fire Department<br>Emergency Hotline: XYXY<br>24-hours online system: URL_XY |
| | A2, B2 | Name: YX State Fire Department<br>Emergency Hotline: YXYX<br>24-hours online system: URL_YX |
| Criminal or Investigation | X2, Y2 | Name: ZZ Police Department<br>Emergency Hotline: ZZZ<br>24-hours online system: URL_Z |
| ... | ... | ... |
| Task N | Xn, Yn | Information N |

FIG. 12

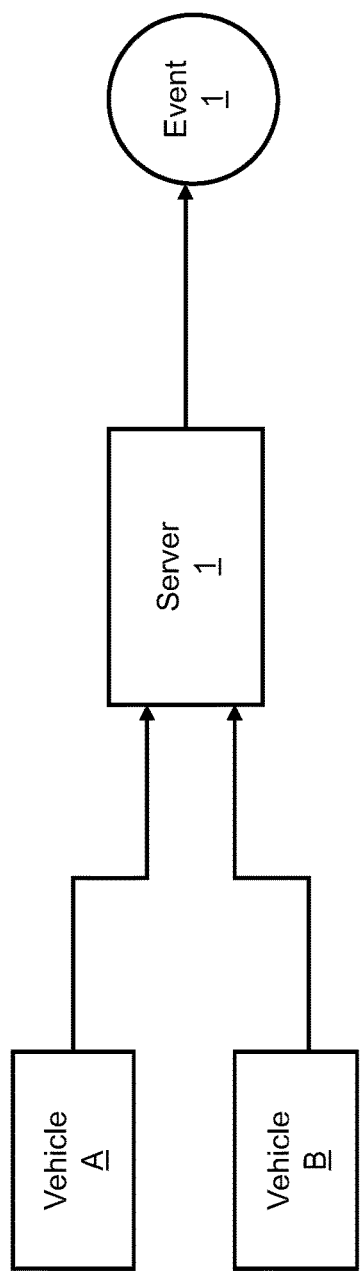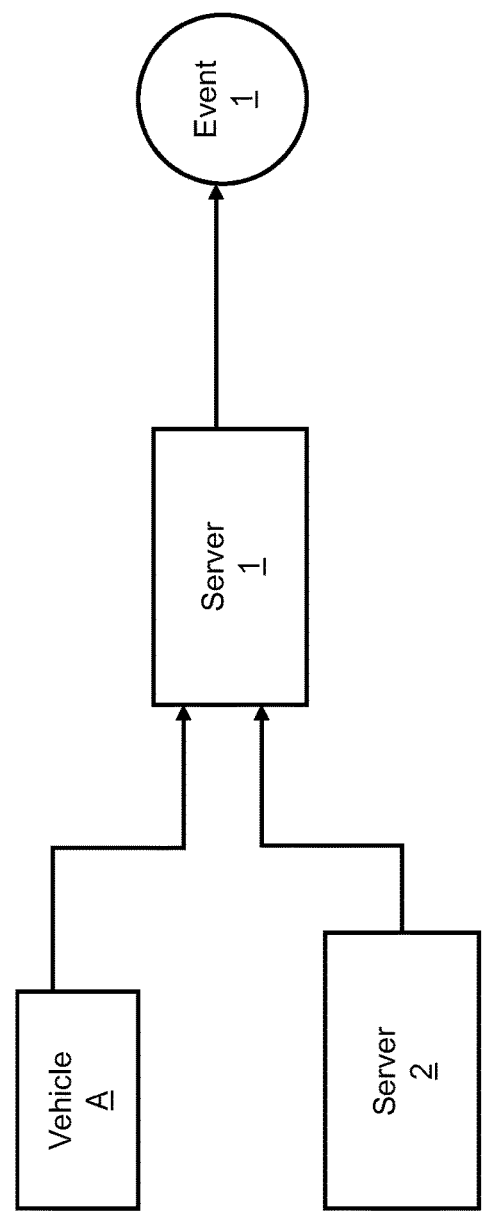

SYSTEM AND METHOD FOR DETECTION AND REPORTING OF EVENTS

TECHNICAL FIELD

Systems and methods consistent with example embodiments of the present disclosure relate to vehicles, and more particularly, relate to systems and methods for detection and reporting of events via data obtained by vehicles.

BACKGROUND

Typically, emergency events such as fires, car accidents, human injuries, and the like, are time-sensitive and require immediate attention from the associated authorities (e.g., medical team, fire department, police department, etc.) such that appropriate actions could be timely provided therefrom.

Conventionally, authorities are alerted to such events only after a person observes and identifies the event and then manually contacts the authorities. Further, some emergency events may not be identified by human observation. For example, a call for help may not be heard by a person who has headphones on or is hard of hearing, an incident occurs behind a vehicle may not be noticed by the driver of the vehicle, and the like.

Accordingly, a human may not be able to immediately identify and report an emergency event(s), and the authorities may not be timely alerted and may not be able to provide an action for responding to the emergency event(s). As a results, the emergency event may cause injury or death, which may be avoided if appropriate action is timely provided by the authorities.

In addition, a human report may contain inaccurate information, such as: inaccurate event location information, false identification of the event, and the like, which may result in false alarming and cause wastage of resources (e.g., time, man power, etc.) of the authorities.

SUMMARY

According to embodiments, methods, systems and devices are provided for automatically detecting and reporting of events. For instance, examples embodiments of the present disclosure provide methods, systems and devices for utilizing onboard devices in vehicles to automatically detect event(s) that may require attention from authority(s), and automatically detect the associated authority(s) and initiate a contact with the associated authority(s) to report the event(s). Furthermore, methods, systems and devices of the example embodiments may automatically verify whether an event(s) is accurately detected, before reporting the event to the authorities.

According to embodiments, a method may be implemented by programmed one or more processors in a vehicle, and the method may include: obtaining sensor data from at least one sensor device on the vehicle; processing the obtained sensor data to determine whether a predetermined event outside of the vehicle has occurred; and based on the predetermined event being determined to have occurred, transmitting information corresponding to the predetermined event to a server.

The transmitted information may include the obtained sensor data. The at least one sensor device may include sensor devices for detecting data external to the vehicle and for detecting data internal to the vehicle.

The obtained sensor data may include at least one of image data, LiDAR sensor data, accelerometer data, audio data, and infrared image data.

The processing the obtained sensor data may include inputting a predetermined sequence of the obtained sensor data to a machine learning model trained to detect the predetermined event.

The obtained sensor data may include audio data; the processing the obtained sensor data may include determining whether the audio data includes a predetermined keyword or is louder than a predetermined threshold.

Additionally or alternatively, the obtained sensor data may include infrared image data; and the processing the obtained sensor data may include determining whether the infrared image data includes a vehicle-shaped object with a temperature greater than a predetermined threshold.

Additionally or alternatively, the obtained sensor data may include LiDAR sensor data; and the processing the obtained sensor data may include determining whether a collision between a vehicle and a pedestrian occurs based on the LiDAR sensor data.

Further, the transmitting the information may include transmitting the information to the server configured to determine or confirm the event has occurred based on sensor data received from a plurality of vehicles.

Additionally or alternatively, the transmitting the information may include transmitting other sensor data, distinct from the obtained sensor data processed to determine the predetermined event, to the server based on the predetermined event being determined to have occurred.

Furthermore, the processing the obtained sensor data may include processing the obtained sensor data, obtained from a plurality of sensor devices, to determine whether the predetermined event has occurred.

Additionally or alternatively, the processing the obtained sensor data may include inputting the obtained sensor data to a plurality of event detection modules to determine whether the predetermined event has occurred.

According to embodiments, a vehicle may include: at least one sensor device; a memory storing instructions; and at least one programmed processor configured to execute the instructions to: obtain sensor data from the at least one sensor device; process the obtained sensor data to determine whether a predetermined event outside of the vehicle has occurred; and based on the predetermined event being determined to have occurred, transmit information corresponding to the predetermined event to a server.

The transmitted information may include the obtained sensor data. The at least one sensor device may include sensor devices for detecting data external to the vehicle and for detecting data internal to the vehicle.

The obtained sensor data may include at least one of image data, LiDAR sensor data, accelerometer data, audio data, and infrared image data.

The obtained sensor data may include audio data; and the at least one programmed processor may be configured to execute the instructions to process the obtained sensor data by determining whether the audio data includes a predetermined keyword or is louder than a predetermined threshold.

Additionally or alternatively, the obtained sensor data may include infrared image data; and the at least one programmed processor may be configured to execute the instructions to process the obtained sensor data by determining whether the infrared image data includes a vehicle-shaped object with a temperature greater than a predetermined threshold.

Additionally or alternatively, the obtained sensor data may include LiDAR sensor data; and the at least one programmed processor may be configured to execute the instructions to process the obtained sensor data by determining whether a collision between a vehicle and a pedestrian occurs based on the LiDAR sensor data.

Further, the at least one programmed processor may be configured to execute the instructions to transmit the information by transmitting the information to the server configured to determine or confirm the event has occurred based on sensor data received from a plurality of vehicles.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like reference numerals denote like elements, and wherein:

FIG. 3 illustrates an example of a record file containing information of sensor data, according to one or more embodiments;

FIG. 11 illustrates a flow diagram of an example method for initiating contact with one or more authorities, according to one or more embodiments;

FIG. 12 illustrates an example of a record file containing information of available authorities, according to one or more embodiments;

FIG. 14 illustrates a block diagram of an operation for obtaining sensor data from a plurality of vehicles, according to one or more embodiments; and FIG. 15 illustrates a block diagram of an operation for obtaining sensor data from a vehicle and another server, according to one or more embodiments.

DETAILED DESCRIPTION

Figure 1:
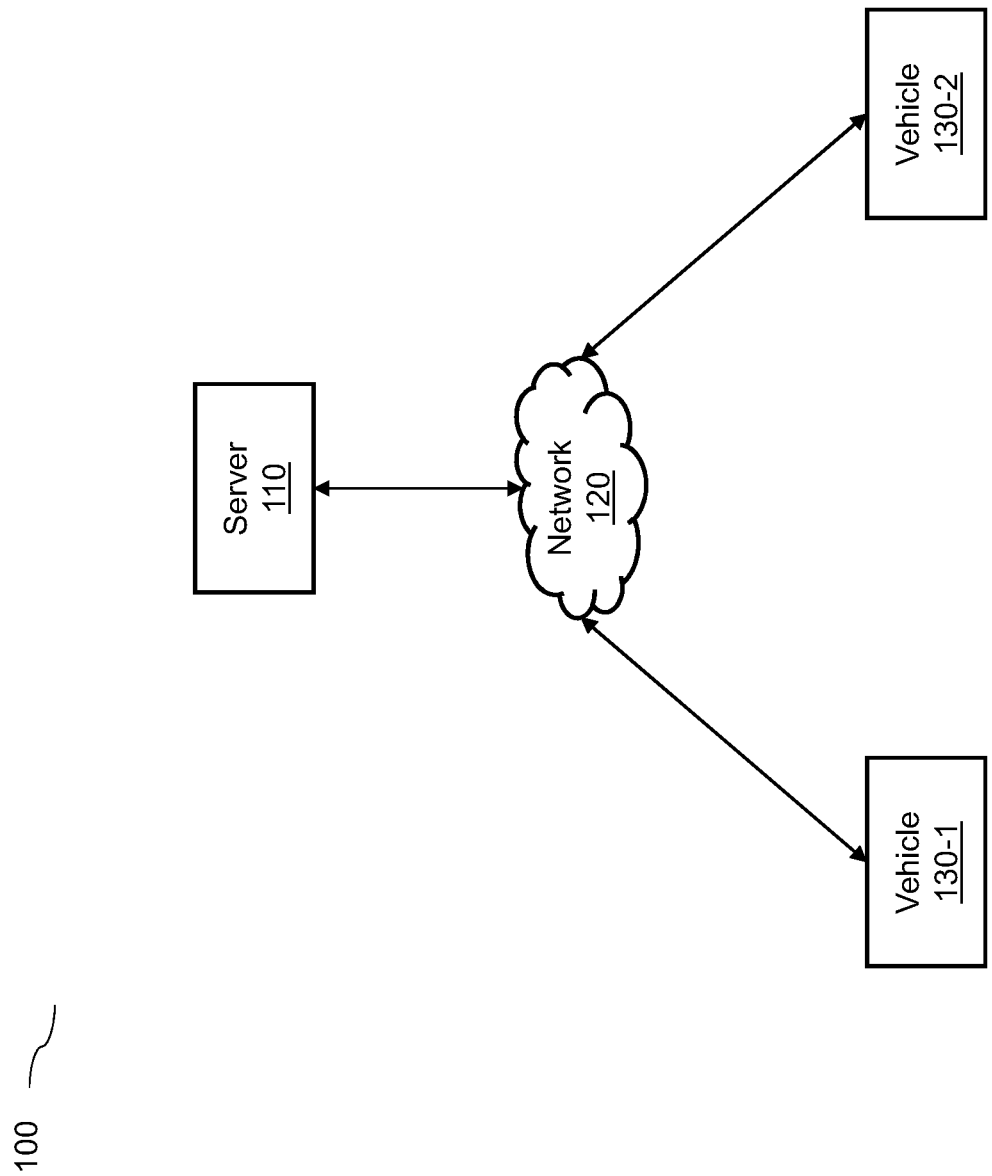
FIG. 1 illustrates a block diagram of an example system for communicating one or more vehicles with a server, according to one or more embodiments.

The following detailed description of exemplary embodiments refers to the accompanying drawings. The foregoing disclosure provides illustration and description but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," "non-limiting exemplary embodiment," or similar language means that a particular feature, structure, or characteristic described in connection with the indicated embodiment is included in at least one embodiment of the present solution. Thus, the phrases "in one embodiment", "in an embodiment," "in one non-limiting exemplary embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

In one implementation of the disclosure described herein, a display page may include information residing in the computing device's memory, which may be transmitted from the computing device over a network to a database center and vice versa. The information may be stored in memory at each of the computing device, a data storage resided at the edge of the network, or on the servers at the database centers. A computing device or mobile device may receive non-transitory computer readable media, which may contain instructions, logic, data, or code that may be stored in persistent or temporary memory of the mobile device, or may somehow affect or initiate action by a mobile device. Similarly, one or more servers may communicate with one or more mobile devices across a network, and may transmit computer files residing in memory. The network, for example, can include the Internet, wireless communication network, or any other network for connecting one or more mobile devices to one or more servers.

Examples embodiments of the present disclosure provide methods and systems for utilizing onboard devices in vehicles to automatically detect event(s) that may require attention from authority(s). Further, upon detecting an event, methods and systems of the example embodiments may automatically report the event to the authorities. Furthermore, methods and systems of the example embodiments may verify whether an event is accurately detected, before reporting the event to the authorities.

Ultimately, example embodiments of the present disclosure provide efficient and effective identification and reporting of events. For instance, identification and reporting of events may occur with less delay than human identification and reporting. Further, events that are not detected or detectable by a human can be effectively and automatically detected. Furthermore, events may be confirmed or detected with higher accuracy, which in turns reduce the rate of false alarm or fake reporting, and thereby conserve resources of authorities.

FIG. 1 illustrates a block diagram of an example system 100 for communicating one or more vehicles with a server, according to one or more embodiments. Referring to FIG. 1, system 100 may include a server 110, a network 120, and a plurality of vehicles (vehicle 130-1 and 130-2).

The server 110 may be communicatively coupled to the plurality of vehicles via the network 120. The server 110 and the plurality of vehicles may be configured to transmit and to receive one or more information to-and-from one another. The information may be exchanged among the server 110 and the plurality of vehicles in the form of signal, network data, and any other suitable form.

Network 120 may include one or more data links that enable the transport of electronic data between the server 110 and the plurality of vehicles (and the components or systems included therein). In this regard, network 120 may include one or more wired and/or wireless networks. For example, network 120 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a Wireless Fidelity (WiFi) network, a private network, a Bluetooth™ network, an ad hoc network, an intranet, the Internet, a fiber optic-based network, or the like, and/or a combination of these or other types of networks. According to embodiments, the plurality of vehicles may transmit information or data to the server 110 via an over-the-air (OTA) transmission using network 120.

The server 110 may include one or more devices capable of receiving, generating, storing, processing, computing, and/or providing information or data. According to embodiments, server 110 may include a cloud server or a group of cloud servers (e.g., server cluster, etc.). According to embodiments, server 110 may be constituted by a plurality of servers, a portion of which may be deployed in different locations. For instance, server 110 may include: an edge server deployed nearby the vehicle 130-1 and/or the vehicle 130-2, a central server deployed further from the vehicle 130-1 and/or the vehicle 130-2, and the like. Further, server 110 may be communicatively coupled to one or more devices associated with an authority (e.g., authority's alert system, emergency event reporting device, etc.). According to embodiments, the server 110 may be managed or operated by the one or more authorities.

The vehicle 130-1 and the vehicle 130-2 may include any motorized and/or mechanical machine which may carry or transport people and/or cargo, such as: a car, a truck, a motorcycle, a bus, a bicycle, a mobility scooter, an aerial vehicle, and the like. The vehicle 130-1 and the vehicle 130-2 may include one or more components configured to detect one or more events and to provide information of the detected event(s) to the server 110.

Figure 2:
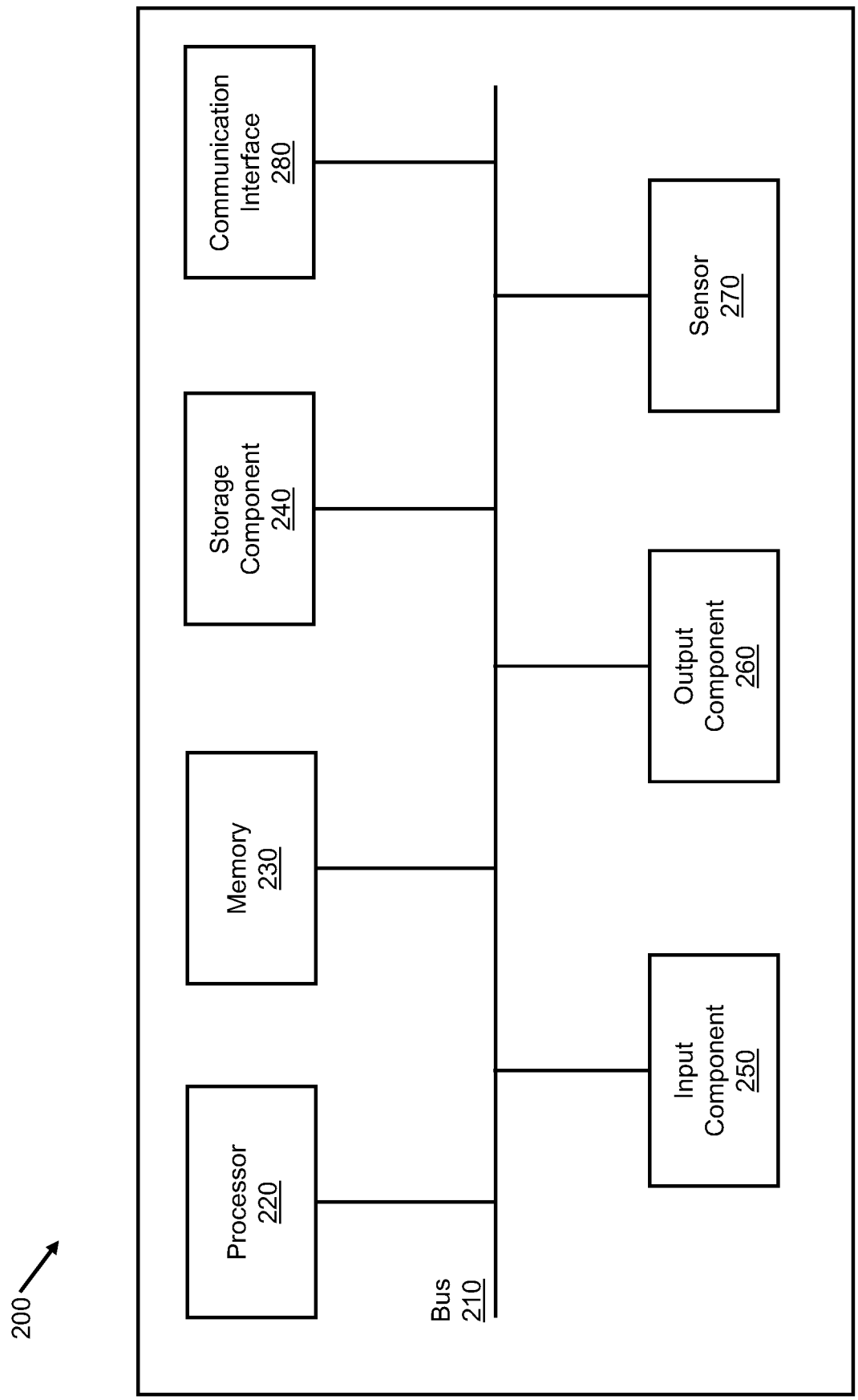
FIG. 2 illustrates a diagram of example components of a vehicle, according to one or more embodiments.

FIG. 2 illustrates a diagram of example components of a vehicle 200, according to one or more embodiments. Vehicle 200 may be similar to vehicle 130-1 and/or vehicle 130-2 in FIG. 1, thus it can be understood that the descriptions associated with vehicle 200 and vehicle 130-1/vehicle 130-2 may be applicable to each other, unless being explicitly described otherwise.

Referring to FIG. 2, vehicle 200 may include a bus 210, a processor 220, a memory 230, a storage component 240, an input component 250, an output component 260, a sensor 270, and a communication interface 280.

Bus 210 may include one or more components that permit communication among the components of vehicle 200. Processor 220 may be implemented in hardware, firmware, or a combination of hardware and software. Processor 220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing or computing component. In some implementations, processor 220 may include one or more processors capable of being programmed to perform a function. Memory 230 may include a random access memory (RAM), a read only memory (ROM), and/or another type of dynamic or static storage device (e.g., a flash memory, a magnetic memory, and/or an optical memory) that stores information and/or instructions for use by processor 220.

Storage component 240 may store information and/or software related to the operation and use of vehicle 200. For example, storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 250 may include one or more components that permit the vehicle 200 to receive information, such as via user input (e.g., a touch screen display, a button, a switch, a microphone, etc.). According to embodiments, the input component 250 may include at least a portion of sensor 270 (further described below). Output component 260 may include one or more components that provide output information from the vehicle 200 (e.g., a display, a speaker, one or more light-emitting diodes (LEDs), etc.).

Sensor 270 may include one or more devices configured to detect, measure, and capture respective data (may be referred to as "sensor data" herein). For instance, the sensor 270 may include: an accelerometer which measures and captures data associated with the acceleration/deceleration of the vehicle, the vehicle speed, the vehicle travel distance, and the like; an image sensor (e.g., camera, etc.) which detects and captures image data internal to, external to, surrounding to, or nearby the vehicle; a light detection and ranging (LiDAR) sensor which detects and captures data associated with light in one or more light spectrums, such as the visible spectrum, the infrared spectrum, the ultraviolet spectrum, and/or any other light spectrums; an audio sensor (e.g., microphone, etc.) which may detect and capture audio data internal and/or external to the vehicle; a temperature sensor which measures and captures data associated with temperature internal and/or external to the vehicle; a location sensor (e.g., global positioning system (GPS), inertial measurement unit (IMU), etc.) which measures and captures data associated with the location, position, and/or orientation of the vehicle; a contact sensor (e.g., pressure detector, impact detector, etc.) which detects and captures data between a portion of the vehicle and an object; an air sensor which measure and captures data associated with the air (e.g., oxygen level, pollution level, humidity level, etc.) internal and/or external to the vehicle; and any other sensors suitable to be deployed in the vehicle.

It can be understood that a portion of the aforementioned sensors may operate with each other to perform a specific operation. For example, the accelerometer and the location sensor may interoperate to measure a current position of the vehicle and to estimate an upcoming position of the vehicle, the image sensor may interoperate with the audio sensor to produce a video recording file, the location sensor may provide position information and timing information to each of the aforesaid sensors such that the data measured/captured by said sensors may be mapped to the corresponding location and time where and when it is measured/captured, and the like.

Further, the sensor 270 may be internet-of-things (IoT) based, which enables the vehicle to communicate with another device via a network. For instance, the vehicle may communicate with one or more external storage mediums to store the measured sensor data therein, may communicate with a server to provide a portion or all of the measured sensor data for further processing, may communicate with another vehicle(s) to exchange data (e.g., for data verification, data enrichment, data correction, etc.), or the like.

Furthermore, the sensor data may be persistently or semi-persistently stored in the vehicle 200 (e.g., store in memory 230 and/or storage component 240, etc.) for a predetermined period of time. In some embodiments, at least some sensor data may be transferred from vehicle 200 (e.g., via an over-the-air transmission over a network) to one or more storage mediums (e.g., a server or a cloud storage, etc.). Metadata or a log of the transferred sensor data or other information indicative of the transferred data may be stored in the vehicle or implicitly known in the control logic of the vehicle. The sensor data may be captured periodically, continuously, intermittently, or based on a trigger event (e.g., a loud sound, a horn actuation, a quick deceleration or a hard braking, a quick turn, etc.).

Referring to FIG. 3, which illustrates an example of a record file 300 containing information of sensor data, according to one or more embodiments. Record file 300 may include sensor data captured by one or more sensor devices deployed in a vehicle (e.g., sensor 270 in FIG. 2) and the associated information, such as location at which the data is measured and captured, time on which the data is measured and captured, parameters specific to the sensor type (e.g., image type, data source, etc.), and the like.

The record file 300 may be stored in the vehicle (e.g., in memory 230 and/or storage component 240, etc.), and/or may be stored in one or more devices external to the vehicle (e.g., cloud server, external storage medium, etc.). Further, it can be understood that multiple record files may be created and stored. For instance, a first record file may be created for recording sensor data provided by the temperature sensor, a second record file may be created for recording sensor data provided by the image sensor, and the like.

Further, it can also be understood that the record file may include more/less information than as illustrated in FIG. 3. For instance, in that case which the sensor data (e.g., metadata, etc.) are stored in an external storage medium(s), the record file may include information of the external storage medium(s) such as access link, storage time, and the like.

Referring back to FIG. 2, the processor 220 of vehicle 200 may be configured to process a portion or all of the sensor data before and/or after storing the sensor data to the storage medium(s). For instance, the processor 220 may be configured to perform one or more of the following operations to the portion or all of the sensor data: pre-processing (e.g., normalizing, encoding, decoding, enriching, etc.), converting (e.g., speech-to-text and/or natural language understanding for audio data), collating (e.g., cataloging, etc.), and filtering (e.g., excluding a portion of the data by detecting or classifying particularly objects or by comparing a threshold against a threshold (e.g., a threshold volume level for captured audio data), etc.). Further, the processor 220 may be configured to anonymize a portion of or all of the received data. For instance, the one or more processors may be configured to determine which of the received data is required to be anonymize (e.g., indicia of the vehicle or user of the vehicle, sensitive information such as travel history of the vehicle, etc.), and to perform one or more suitable data anonymizations (e.g., erasing, encrypting, etc.) on said data.

According to embodiments, the processor 220 may perform on or more of the aforesaid operations via utilizing one or more artificial intelligence (AI) models or machine learning (ML) models (e.g., input at least a portion of the received data to one or more AI/ML models trained to performed the aforesaid operations, etc.). The one or more AI/ML models may be pre-trained and stored in the one or more storage mediums, and may be retrieved and utilized by the processor 220 when required. According to embodiments, in addition to utilizing the one or more AI/ML models to perform the aforesaid operation(s), the processor 220 may also train the one or more AI/ML models with the sensor data. Further, the processor 220 may also utilize one or more AI/ML models and/or any suitable rule-based module (e.g., keyword mapping algorithm, etc.) to detect one or more events (and/or event characteristics associated therewith).

Communication interface 280 may include a transceiver-like component (e.g., a transceiver and/or a separate receiver and transmitter) that enables the vehicle 200 to communicate with other devices, such as via a wired connection, a wireless connection, or a combination of wired and wireless connections. Communication interface 280 may permit vehicle 200 to receive information from another device (e.g., server 110, another vehicle, etc.) and/or provide information to said another device. For example, communication interface 280 may include an Ethernet interface, an optical interface, a coaxial interface, an infrared interface, a radio frequency (RF) interface, a universal serial bus (USB) interface, a Wi-Fi interface, a cellular network interface, or the like. According to embodiments, communication interface 280 may communicatively couple the vehicle 200 (and one or more components included therein) to the server (e.g., server 110) via the network (e.g., network 120), and to enable information or data exchange among the vehicle and the server.

In view of the above, the vehicle may include components for capturing sensor data and for communicating the sensor data and/or the associated information (e.g., event detected based on the sensor data, etc.) to another device(s) (e.g., a server, another vehicle, etc.).

The captured sensor data may be utilized for various purposes, including autonomous driving, object detection, voice activation, and the like. According to example embodiments of the present disclosure, the sensor data may be utilized for detecting an event that may require attention from the authorities. Specifically, sensor data may be processed and analyzed to detect a predetermined event (and/or a characteristic of the predetermined event), and information corresponding to the predetermined event may be transmitted to a server thereafter.

Figure 4:
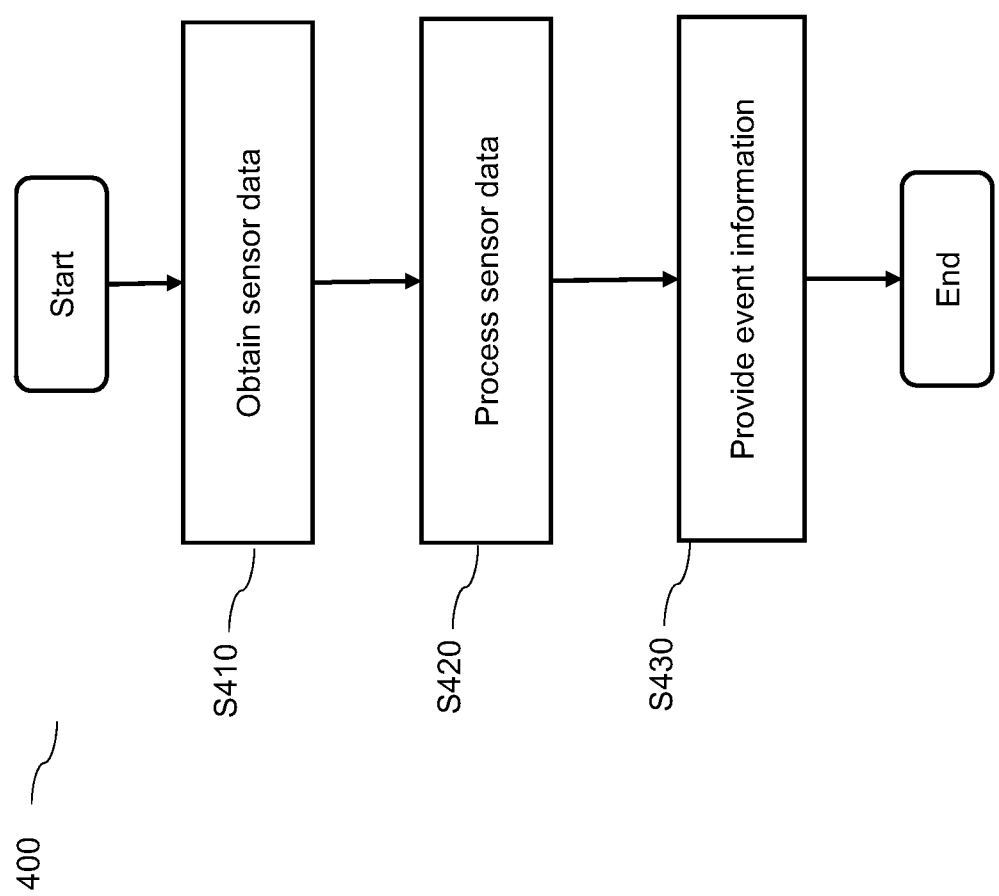
FIG. 4 illustrates a flow diagram of an example method for detecting a predetermined event and providing the corresponding information, according to one or more embodiments.

FIG. 4 illustrates a flow diagram of an example method 400 for detecting a predetermined event and providing the corresponding information, according to one or more embodiments. Method 400 may be performed by processor 220 of vehicle 200, based on sensor data captured by sensor 270 and information stored in memory 230 and/or storage component 240 (e.g., record file(s), AI model(s), ML model(s), rule-based algorithm(s), etc.).

Referring to FIG. 4, at operation S410, a vehicle may obtain one or more sensor data. For instance, one or more processors of the vehicle (e.g., processor 220) may be configured to obtain, from one or more storage mediums (e.g., memory 230, storage component 240, external storage medium(s), etc.), sensor data stored in said one or more storage mediums.

Alternatively or additionally, the one or more processors may be configured to obtain sensor data directly from one or more sensors (e.g., sensor 270) or associated device(s) in real-time or near real-time. According to embodiments, the one or more processors may periodically (or continuously) query or request the one or more sensors to provide the respective sensor data.

According to embodiments, the one or more processors may obtain record file(s) (e.g., record file 300 in FIG. 3, etc.) from the one or more storage mediums, analyze whether an update has occurred in the sensor data by analyzing the record file(s) (e.g., whether or not new sensor data is obtained, etc.), and obtain the sensor data associated with the update (e.g., newly added or obtained sensor data, etc.) thereafter.

According to embodiments, the obtained sensor data may include at least one of image data, LiDAR sensor data, accelerometer data, audio data, infrared image data, and data of any sensor suitable to be deployed on the vehicle.

At operation S420, the vehicle may process the obtained sensor data. For instance, the one or more processors of the vehicle may be configured to analyze the sensor data to determine whether a predetermined event has occurred. The predetermined event may be any event defined as "emergency" by the vehicle manufacturer, the vehicle owner/driver, the authorities, and the like. Further, the predetermined event may be an event occurs inside (internal to), outside (external to), and/or nearby the vehicle.

For example, the one or more processors may analyze: infrared camera data to detect an object (e.g., object with vehicle-shape, etc.) with an unusually high temperature (e.g., greater than some predefined threshold), indicative of a fire; LiDAR sensor data to detect a collision between a pedestrian and a vehicle with the pedestrian subsequently not moving; audio data captured by a microphone to detect loud noises, a particular keyword (e.g., "help", etc.) internal or external to the vehicle, or local sirens/alarms (e.g., from a nearby building); accelerometer data and seismometer data to detect an earthquake; image data to detect the color red, indicate of blood, or to detect a broken body part; air quality data to detect gas leakage (e.g., from a nearby vehicle and/or building); and/or any other suitable sensor data to detect any event inside, outside, and/or nearby the vehicle.

According to embodiments, the obtained sensor data may include audio data, and the one or more processors of the vehicle may process the obtained sensor data by determining whether the audio data includes one or more predetermined keywords and/or is louder than a predetermined threshold.

According to embodiments, the obtained sensor data may include infrared image data, and the one or more processors of the vehicle may process the obtained sensor data by determining whether the infrared image data includes one or more vehicle-shaped objects with a temperature greater than a predetermined threshold.

According to embodiments, the obtained sensor data may include LiDAR sensor data, and the one or more processors of the vehicle may process the obtained sensor data by determining whether a collision between a vehicle and a pedestrian occurs based on the LiDAR sensor data.

According to embodiments, the one or more processors of the vehicle may process all or a sequence of sensor data (e.g., a predefined sample of data points, a predetermined number of data points every predetermined time interval, etc.) to analyze and detect one or more predetermined events.

For instance, the one or more processor may input all or the sequence of sensor data to one or more event detection models or modules to detect one or more events. The one or more event detection models/modules may include any suitable artificial intelligence (AI)/machine learning (ML) models (e.g., supervised models, unsupervised models, etc.), any suitable algorithms (e.g., rule-based algorithms, etc.), or a combination thereof, and may be implemented in the form of computer-executable instructions. Further, the one or more event detection models/modules may be trained to detect one or more predetermined events, and may be stored in one or more storage mediums in the vehicle (e.g., memory 230, storage component 240, etc.).

By way of an example, the one or more processors may utilize one or more rule-based algorithms to compare the sensor data against one or more predetermined rules (e.g., detected audio louder than predetermined threshold, detected audio including predetermined keyword, detected temperature of object greater than predetermined threshold, etc.). Accordingly, the one or more processors may determine whether or not one or more predetermined events have occurred, based on determining whether or not the sensor data complies with the one or more predetermined rules.

As another example, the one or more processors may input all or the sequence of sensor data to one or more AI/ML models to detect a corresponding event. The one or more AI/ML models may be respectively trained to detect or predict the same event, partially different events, or different events. Accordingly, the one or more processors may determine whether or not one or more predetermined events have occurred, by inputting the sensor data to the one or more AI/ML models and analyze the output of said AI/ML models thereafter.

According to embodiments, the one or more processors of the vehicle may utilize one or more event detection modules to detect one or more predetermined events (and/or one or more characteristics associated therewith). For instance, the one or more processors may input or provide one or more sensor data to the one or more event detection modules, and may determine from the output of the one or more event detection modules whether the one or more predetermined events (and/or the one or more predetermined event characteristics associated therewith) has occurs. Each of the one or more event detection modules may be a software-based module, a hardware-based module, or a combination thereof, may be configured to utilize one or more rule-based algorithms, one or more AI/ML models, or a combination thereof to detect a respective event(s) (and/or the predetermined event characteristic(s) associated therewith).

According to embodiments, the one or more event detection modules may directly output the result of event detection (e.g., a predetermined event has/has not occurred, etc.), and the one or more processors may simply utilize said result accordingly. According to other embodiments, the one or more event detection modules may output one or more parameters required for detecting the event (e.g., event characteristics, event categorization/classification, event prediction, etc.), and the one or more processors may determine the result of the event detection based on the one or more parameters thereafter.

Example embodiments of utilizing one or more event detection modules to detect one or more predetermined events (and/or one or more predetermined event characteristics associated therewith) at operation S420 are described below with reference to FIG. 5 to FIG. 8.

Figure 5:
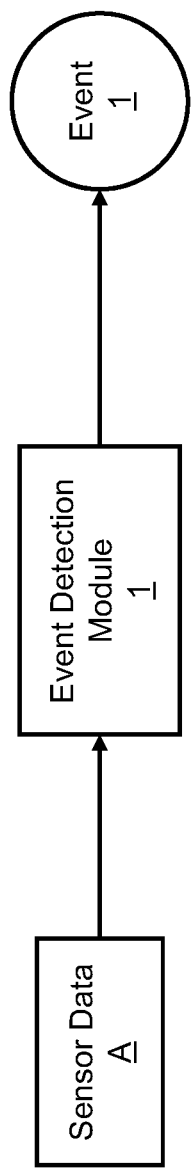
FIG. 5 illustrates a block diagram of an example operation for utilizing an event detection module to detect an event, according to one or more embodiments.

Referring first to FIG. 5, which illustrates a block diagram of an example operation for utilizing an event detection module to detect an event, according to one or more embodiments. As illustrated in FIG. 5, sensor data A (i.e., data captured and provided by a sensor A) may be provided or inputted by the one or more processors of the vehicle to an event detection module 1, and the output of the event detection module 1 may be utilized by the one or more processors to determine whether or not an event 1 has occurred.

By way of example, the event detection module 1 may be utilized to detect one or more objects (and/or one or more characteristics associated with the one or more objects), and sensor data A may include image data captured from an infrared camera (i.e., an image sensor). According to embodiments, sensor data A may be inputted or provided to the event detection module 1 to determine whether or not the captured image data include any object having a temperature greater than a predetermined threshold. Based on determining that the output of the event detection module 1 indicates that the image data includes an object having the temperature greater than the predetermined threshold, the one or more processors may determine that event 1 has occurred, and vice versa. According to other embodiments, sensor data A may be inputted or provided to the event detection module 1 to determine whether or not the captured image data include any object having a temperature within a range of temperature, and the one or more processors may utilize the result thereof to determine whether or not event 1 has occurred (e.g., whether or not the object having the temperature within the range of temperature is an object having a temperature greater than a predetermined threshold, etc.).

According to embodiments, an output of an event detection module may be inputted or provided to another event detection module(s) to detect another event(s). For example, referring to FIG. 6, which illustrates a block diagram of an example operation for utilizing an output of an event detection module to detect an event, according to one or more embodiments.

Figure 6:
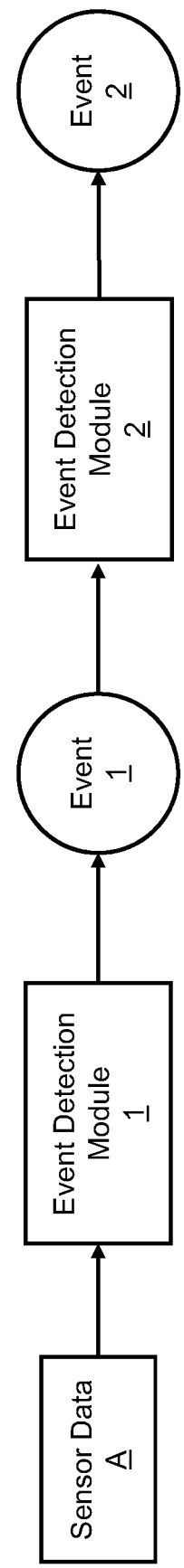
FIG. 6 illustrates a block diagram of an example operation for utilizing an output of an event detection module to detect an event, according to one or more embodiments.

As illustrated in FIG. 6, the output (illustrated as "Event 1") of the event detection module 1 (described above with reference to FIG. 5) may be inputted or provided to an event detection module 2 to detect an event 2. It can be understood that the output of the event detection module 1 may be directly provided by the event detection module 1 to the event detection module 2, may be processed by the one or more processors of the vehicle and then provided by the one or more processors to the event detection module 2, or the like.

By way of example, assuming that event 1 (i.e., output of event detection module 1) indicates that the image data includes an object having a temperature greater than a predetermined threshold, the event information and the associated image data may be inputted or provided (e.g., by the even detection module 1, by the one or more processors, etc.) to the event detection module 2, and the event detection module 2 may detect the type of the object accordingly. For instance, the event detection module 2 may detect, based on the event information and/or the image data, whether the object is a vehicle, an obstacle, a building, a human, and the like.

According to embodiments, one or more events (and/or event characteristics associated therewith) may be detected based on sensor data provided by a plurality of sensors and/or a plurality of event detection models/modules.

Namely, the one or more processors of the vehicle may process sensor data obtained from a plurality of sensors to determine whether or not one or more predetermined events (and/or one or more predetermined event characteristics associated therewith) have occurred, may process sensor data obtained from one sensor by inputting the obtained sensor data to a plurality of event detection modules to determine whether the one or more predetermined events (and/or one or more predetermined event characteristics associated therewith) have occurred, or may process sensor data from a plurality of sensors (or devices with similar functionality) by inputting the obtained sensor data to a plurality of event detection modules to determine whether the one or more predetermined events (and/or one or more predetermined event characteristics associated therewith) have occurred.

Figure 7:
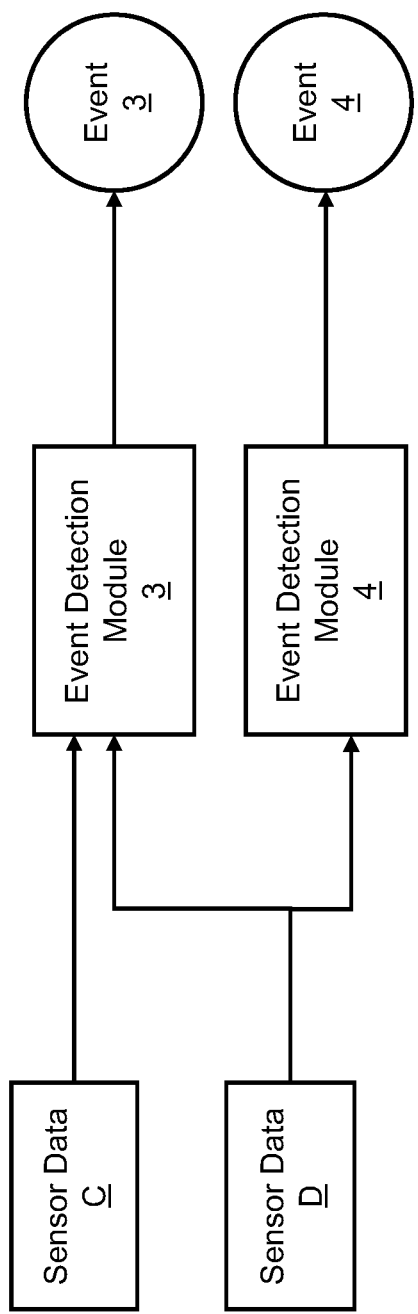
FIG. 7 illustrates a block diagram of an example operation for utilizing sensor data obtained from a plurality of sensor devices with an event detection module and for utilizing sensor data obtained from a sensor device with a plurality of event detection modules, according to one or more embodiments.

For example, referring to FIG. 7, which illustrates a block diagram of an example operation for utilizing sensor data obtained from a plurality of sensor devices with an event detection module and for utilizing sensor data obtained from a sensor device with a plurality of event detection modules, according to one or more embodiments.

As illustrated in FIG. 7, sensor data C-D (i.e., data provided by sensors C-D, respectively) may be inputted or provided by the one or more processors of the vehicle to at least one of event detection modules 3-4.

For instance, sensor data C (provided by a sensor C) and sensor data D (provided by a sensor D) may be inputted or provided (e.g., simultaneously, sequentially, etc.) to an event detection module 3 to detect an event 3. By way of example, sensor data C may include impact data (e.g., captured by a contact sensor, etc.) defining an impact/contact of the vehicle with an object, sensor data D may include image data (e.g., captured by one or more image sensors such as internal camera, front facing camera, etc.) defining an expression of one or more users (e.g., vehicle driver, vehicle passengers, pedestrian nearby the vehicle, etc.), and event detection module 3 may be utilized to detect whether or not the vehicle has experienced unintended impact/contact based on the expression of the one or more users. Based on determining that the impact data indicates an impact/contact level exceeding a predetermined threshold and based on determining that the image data indicates a specific expression (e.g., surprised/frightened facial expression, etc.) of the one or more users, event detection module 3 may determine (or output parameters for determining) that an unintended impact/contact (e.g., vehicle crash, etc.) has occurred (e.g., event 3 has occurred, etc.).

Further, as illustrated in FIG. 7, in addition to providing sensor data D to the event detection module 3 to detect the event 3 (as described above), sensor data D may also be inputted or provided (e.g., simultaneously, sequentially, etc.) to an event detection module 4 to detect an event 4.

By way of example, assuming that sensor data D include image data defining the expression of the one or more users, in addition to being provided to the event detection module 3 to detect whether or not the vehicle has experience unintended impact/contact (as described above), sensor data D may also be provided to the event detection module 4 to detect a status of the one or more users (e.g., whether the driver is sleepy, whether the driver is looking around and is not focusing on the road, whether or not a pedestrian in front of the vehicle has a tendency of crossing the road, etc.).

Figure 8:
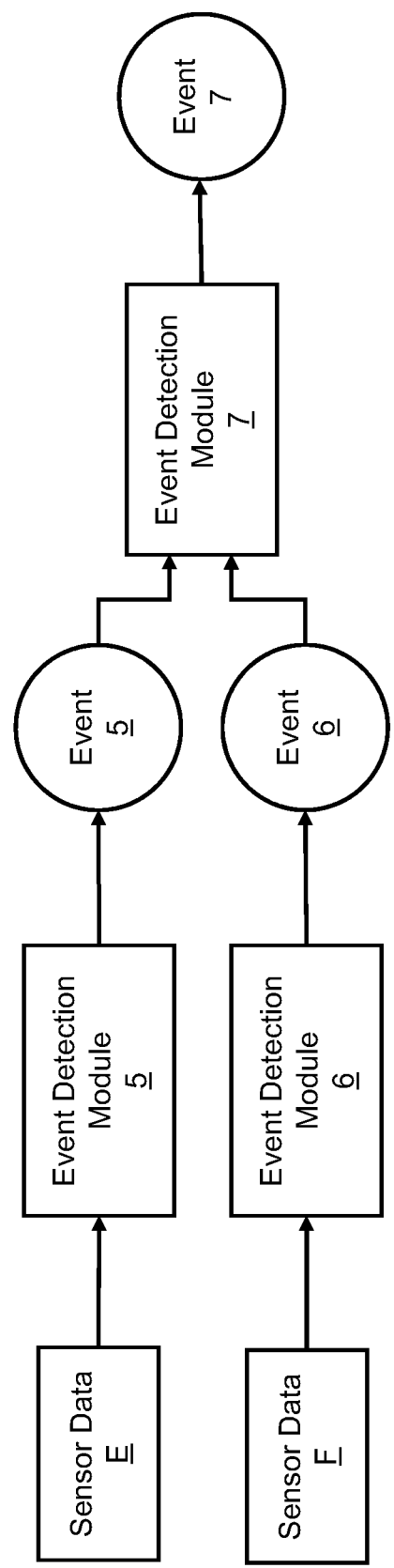
FIG. 8 illustrates a block diagram of an example operation for utilizing sensor data obtained from a plurality of sensor devices with a plurality of event detection modules, according to one or more embodiments.

Referring next to FIG. 8, which illustrates a block diagram of an example operation for utilizing sensor data obtained from a plurality of sensor devices with a plurality of event detection modules, according to one or more embodiments.

As illustrated in FIG. 8, an event 7 may be detected by a plurality of event detection modules 5-7. By way of example, sensor data E (provided by a sensor E) may include accelerometer data and event detection module 5 may be utilized to detect whether the vehicle has experienced static or dynamic acceleration forces higher than a predetermined threshold. On the other hand, sensor data F (provided by a sensor F) may include seismometer data and event detection module 6 may be trained to detect whether the vehicle has experienced ground movements/vibrations higher than a predetermined threshold. Accordingly, the output of event detection module 5 (e.g., the vehicle has/has not experienced static or dynamic acceleration forces higher than the predetermined threshold) and the output of the event detection module 6 (e.g., the vehicle has/has not experienced ground movements/vibrations higher than the predetermined threshold) may be inputted or provided (e.g., by the one or more processors of the vehicle, by the event detection modules 5-6, etc.) to an event detection module 7 to detect whether earthquake, excavation, boring, drilling, or similar event, has occurred.

It can be understood that the operations described above with reference to FIG. 5 to FIG. 8 are merely examples of possible processing performed by the one or more processors of the vehicle (e.g., at operation S420 in FIG. 4) to detect one or more predetermined events (and/or one or more predetermined event characteristics associated therewith), and other possible arrangement, modification, and combination should not be excluded from the scope of the present disclosures.

Referring back to FIG. 4, upon processing the sensor data to detect one or more predetermined events (and/or one or more predetermined event characteristics associated therewith), at operation S430, information associated with the one or more predetermined events may be provided to a server (e.g., server 110) for further analysis or for reporting to authorities.

For instance, the one or more processors of the vehicle may transmit a sequence of sensor data that is used to detect the event, a larger amount of sensor data that includes the sequence of sensor data and sensor data captured before and/or after the sequence, as well as the associated event information (e.g., event location information, event time information, event results, event characteristic, event prediction, etc.) to the server through a network (e.g., network 120) via a communication interface (e.g., communication interface 280, etc.).

Further, sensor data from one or more other sensors may also be provided to the server. For instance, if a predetermined keyword (e.g., help) is detected from an audio data (captured by an audio sensor), then both the audio data and associated image data (e.g., data captured by one or more image sensors at a location nearby the event location during the event time, etc.) may be transmitted to the server.

Moreover, the sensor data processed to detect the event may not be transmitted to the server, and instead, a message or information (e.g., generated by the one or more processors of the vehicle in real-time or near real-time, etc.) indicative of the event detection and/or other sensor data may be transmitted to the server. For example, if a predetermined keyword (e.g., "help", "injured", etc.) is detected from the audio data, the audio data may not be transmitted to the server, and instead, a short message (e.g., "Medical support required immediately", etc.), information (e.g., brief descriptions of the detected event, etc.), and/or the associated image data may be provided to the server.

Figure 9:
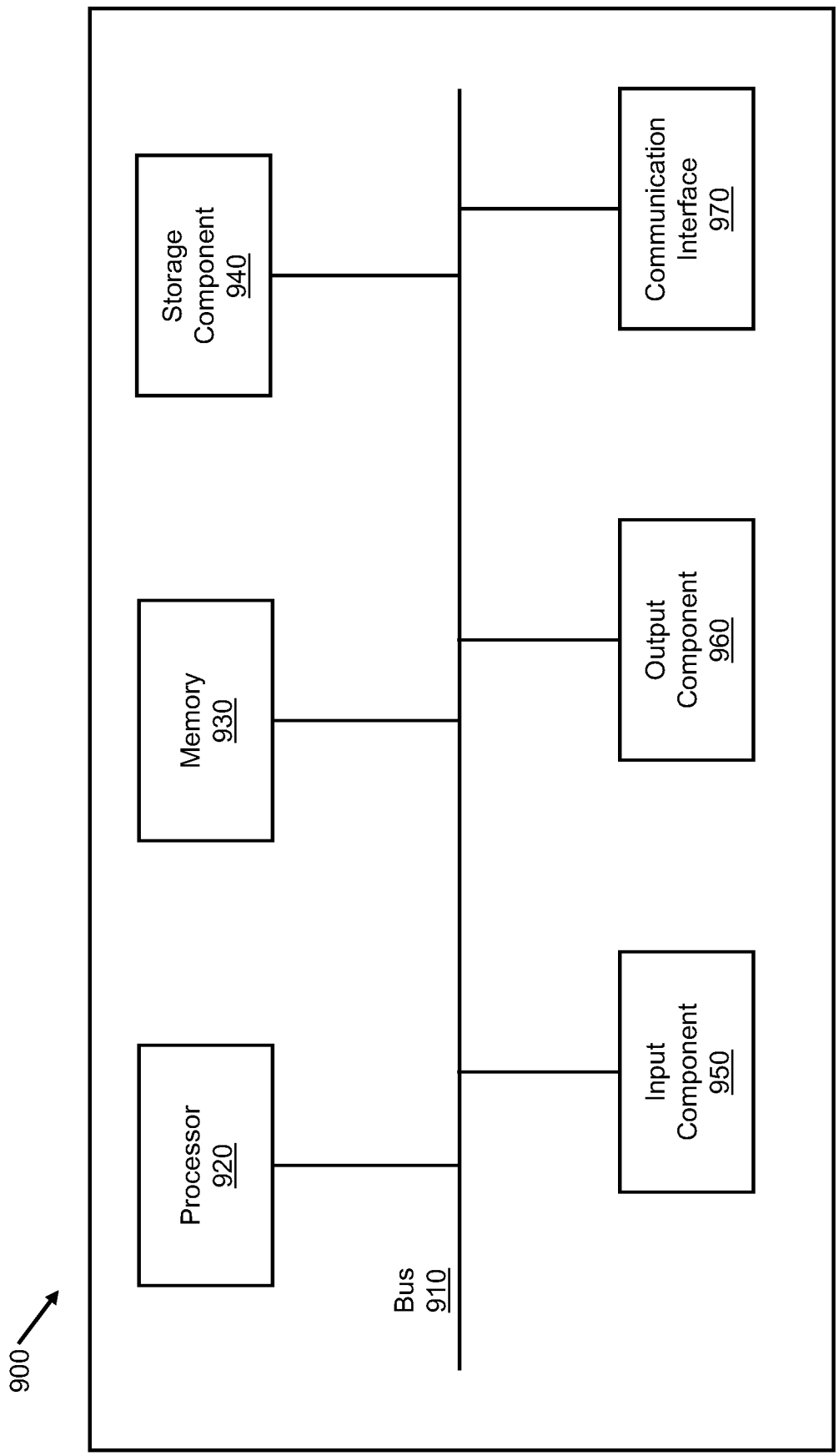
FIG. 9 illustrates a diagram of example components of a server, according to one or more embodiments.

Referring next to FIG. 9, which illustrates a diagram of example components of a server 900, according to one or more embodiments. Server 900 may be similar to server 110 in FIG. 1 and may be similar to any server described above with reference to FIG. 2 to FIG. 8. Thus the descriptions associated with server 900 and the server described in FIG. 1 to FIG. 8 may be applicable to each other, unless being explicitly described otherwise.

Referring to FIG. 9, server 900 may include a bus 910, a processor 920, a memory 930, a storage component 940, an input component 950, an output component 960, and a communication interface 970, each of which may have functionality and role similar to the bus 210, the processor 220, the memory 230, the storage component 240, the input component 250, the output component 260, and the communication interface 280, respectively, described above with reference to FIG. 2. Thus, redundant descriptions associated therewith may be omitted in below for conciseness.

Server 900 may be managed or operated by one or more authorities, may be managed or operated by one or more vehicle manufacturers (e.g., manufacture of vehicle from which the sensor data is provided, etc.), and/or may be managed or operated by any suitable party(s) that may appropriately manage or utilize the sensor data and/or event information.

According to embodiments, server 900 may be configured to receive sensor data and/or event information from one or more vehicles (e.g., vehicle 130-1, vehicle 130-2, vehicle 200, etc.), and to manage the sensor data and/or event information thereafter. For instance, the server 900 (or the processor 920 associated therewith) may be configured to contact authorities based on the received sensor data and/or event information, to further process sensor data and/or event information (further described in below), to store the sensor data and/or event information (e.g., store as evidence that may be used to investigate a crime such as a hit-and-run or vehicular assault or prosecute a criminal, store as evidence to later determine the cause or who is at fault for a particular incident, such as a car accident, etc.), to share the sensor data and/or event information with one or more other devices (e.g., other servers, other vehicles, etc.), and the like.

Figure 10:
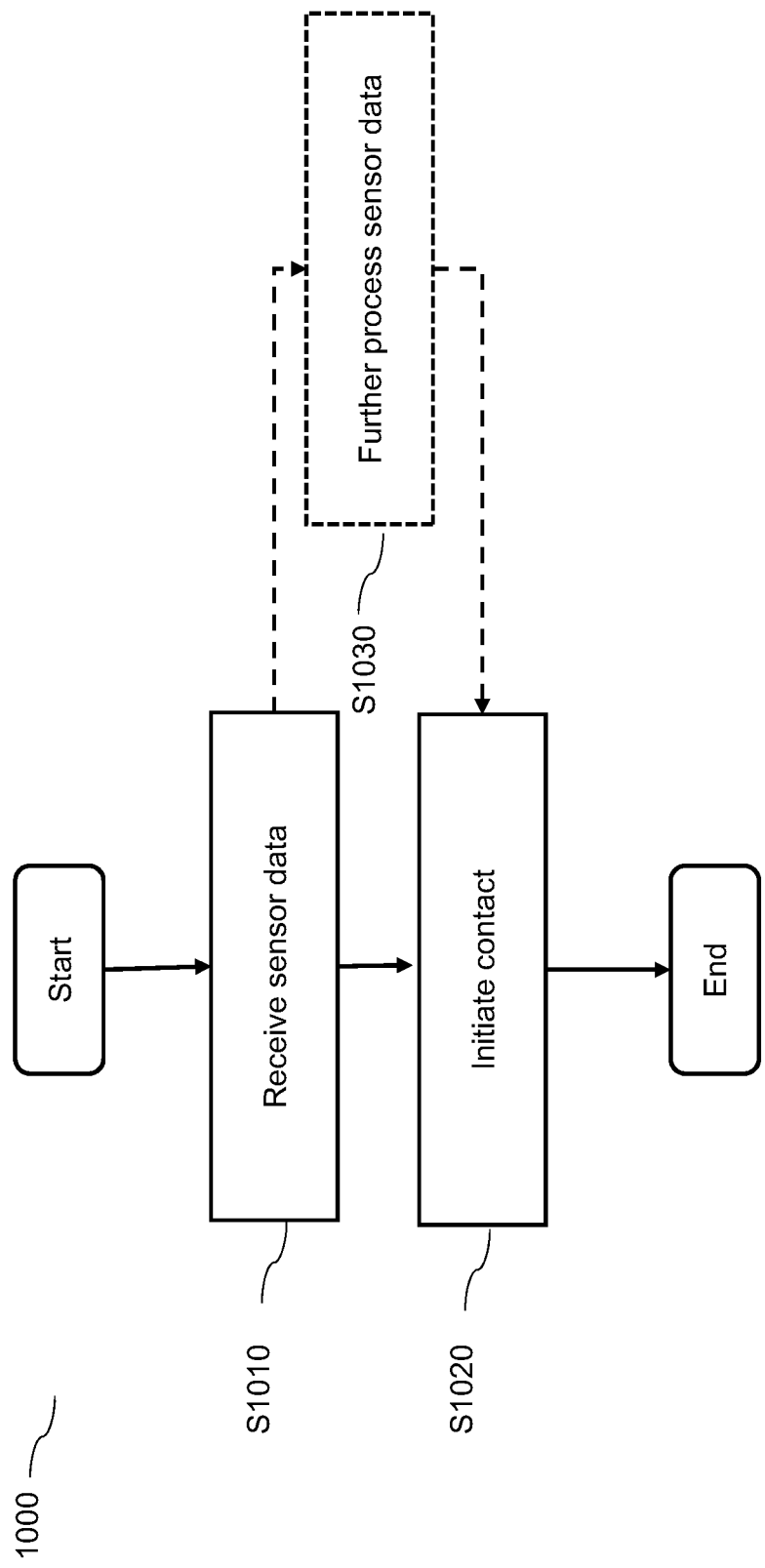
FIG. 10 illustrates a flow diagram of a method for managing sensor data, according to one or more embodiments.

Referring to FIG. 10, which illustrates a flow diagram of a method 1000 for managing sensor data, according to one or more embodiments. Method 1000 may be performed by server 110 of FIG. 1 or server 900 (or the processor 920 associated therewith) of FIG. 9.

As illustrated in FIG. 10, at operation S1010, a server may receive sensor data from one or more vehicles. For instance, one or more processors (e.g., processor 920, etc.) of the server (e.g., server 110, server 900, etc.) may be configured to receive sensor data from one or more vehicles (e.g., vehicle 130-1, vehicle 130-2, vehicle 200, etc.) that have detected one or more predetermined events (and/or one or more predetermined event characteristics thereof).

The one or more processors of the server may receive the sensor data via a communication interface (e.g., communication interface 970, etc.) through a network (e.g., network 120). Alternatively or additionally, the one or more processors may receive the sensor data via one or more storage mediums (e.g., memory 930, storage component 940, etc.) which are configured to obtain the sensor data from the one or more vehicles via the communication interface and to store the obtained sensor data therein.

The received or obtained sensor data may include a sequence of sensor data that is used (e.g., used by the one or more vehicles, etc.) to detect an event (or a characteristic thereof), a larger amount of sensor data that includes the sequence of sensor data, and sensor data captured before and/or after the sequence, as well as the associated event information (e.g., event location information, event time information, etc.).

At operation S1020, the server may initiate a contact with one or more authorities. For instance, the one or more processors of the server may determine one or more authorities associated with the event, may obtain information of the one or more associated authorities, and may provide information of the event to the one or more associated authorities thereafter. The process of contacting the authority may be performed automatically by the server. Further descriptions associated with the operations for initiating contact with the one or more authorities are provided below with reference to FIG. 11 to FIG. 12.

Referring still to FIG. 10, upon receiving sensor data at operation S1010 and prior to initiating the contact with the one or more associated authorities at operation S1020, the server may perform an optional operation S1030, in which the received sensor data is further processed. For instance, at the optional operation S1030, the one or more processors of the server may verify the event occurrence, may enrich the sensor data, and the like. Further descriptions associated with the operations for further processing the received sensor data are provided below with reference to FIG. 13.

Referring next to FIG. 11, which illustrates a flow diagram of an example method 1100 for initiating a contact with one or more authorities, according to one or more embodiments. One or more operations of method 1100 may be part of operation S1020 in FIG. 10, and may be performed by the one or more processor of the server.

As illustrated in FIG. 11, at operation S1110, one or more authorities associated with an event is determined. For instance, the one or more processors of the server may be configured to determine, based on the sensor data and/or the event information, one or more authorities most suitable for handling or responding to the event.

According to embodiments, the one or more processors may determine a type of the event, such as the type of incident(s) involved in the event, type of response(s) required from authority(s), and the like. For instance, the one or more processors may determine, based on the sensor data and/or the event information, that a car accident (e.g., an event) has involved human injuries, hit-and-run incident, and a vehicle on fire.

According to embodiments, the one or more processors may utilize one or more event type detection modules (e.g., one or more modules utilizing one or more rule-based algorithms, one or more AI/ML models, or a combination thereof, etc.) to determine the type of event. For instance, the one or more processors may input or provide sensor data and/or event information associated with the car accident to the one or more event type detection modules, and the one or more event type detection modules may determine (e.g., based on keywords included in the sensor data, etc.) that the car accident involves: injury/medical related incident, criminal incident, and firefighting/rescue related incident.

Upon determining the type of event, the one or more processors may obtain, from one or more storage mediums (e.g., memory 930, storage component 940, etc.), information of available authorities (e.g., authorities in system record, authorities with available man power, etc.). The information of each available authority may be pre-stored in the one or more storage mediums in the form of, for example, a record file.

For example, referring to FIG. 12, which illustrates an example of a record file 1200 containing information of available authorities, according to one or more embodiments. Record file 1200 may be obtained by the server and/or provided by the respective authority, continuously, periodically, or in response to a triggering event.

As illustrated in FIG. 12, the information of available authorities may include type or category of authorities (e.g., medical, rescue, criminal, etc.), location of each authority, name of authority, contact of authority (e.g., hotline contact, online contact, etc.), type of authority, and the like.

It can be understood that the record file may include more/less information than as illustrated in FIG. 12, and/or the information may be arranged in a different manner. For instance, multiple record files may be created and stored, e.g., a first record file may be created for recording information of authorities associated with the type of "medical", "injury", or "illness", and a second record file may be created for recording information of authorities associated with the type of "criminal" or "investigation", and the like.

Further, it can also be understood that the information included in the record file may be continuously (or periodically) updated by the server and/or by the associated authority(s) to include the latest information (e.g., latest availability, latest contact information, etc.).

To this end, upon determining the event type, the one or more processors of the server may obtain, from the one or more storage mediums, information of available authority(s) (e.g., in the form of record file, etc.), and may determine most appropriate or suitable authority(s) for handling the incident(s) involved in the event.

By way of example, based on determining that the received sensor data (received at operation S1010) indicates a car accident involving injury related incident, criminal related incident, and firefighting/rescuing related incident, the one or more processors of the server may obtain a record file (e.g., record file 1200) containing information of available authorities from the one or more storage mediums, may determine (e.g., based on keyword searching, based on predefined mappings, etc.) which authority(s) is most appropriate or suitable to handle injury related incident, criminal related incident, and/or firefighting/rescuing related incident, and may determine the contact method therefrom.

According to embodiments, the one or more processors of the server may compare the event type to the authority type to determine a relevancy level there between, and may select the authority(s) which has a highest relevancy level as the most appropriate or suitable authority(s). For example, the one or more processors may determine that the car accident involve injury related incident, and may determine that "XX Medical Center" has a higher relevancy level to the car accident (as compared to "YY National Hospital"), since authority type of "XX Medical Center" has a keyword "Injury" included therein, indicating that "XX Medical Center" is available to handle injury related incident of the car accident. Accordingly, the one or more processors may select "XX Medical Center" as one of the authorities to be contacted for reporting the car accident.

According to embodiments in which multiple authorities are available for handling a same type of incident, the one or more processors may determine, based on the event information, the most appropriate authority from the multiple available authorities. For instance, in the example illustrated in FIG. 12, two authorities "XY State Fire Department" and "YX State Fire Department" are available for handling firefighting/rescuing related incident of the car accident. In this regard, the one or more processors may determine the event location (e.g., location in which firefighting/rescuing is needed) and select the authority nearest to the event location as one of the authorities to be contacted for reporting the car accident.

Referring back to FIG. 11, upon determining the associated authority(s) to be contacted, at operation S1120, the server may provide the event information to the determined authority(s). The event information may include: location of the event, identification information of the event, urgency level of the event, incidents involved in the event, and any other suitable information which enable the authority(s) to prepare a responding action based thereon.

For instance, the one or more processors of the server may generate a textual report and transmit the textual report to one or more devices of the associated authority(s), may generate a broadcast audio file and provide the same to a broadcasting system of the associated authority(s), may generate a triggering signal to trigger an alarming system of the associated authority(s), and the like.

According to embodiments in which the server is managed or operated by the associated authority(s), the one or more processors of the server may directly provide the event information through an output component of the server (e.g., output component 960, etc.). For instance, the output component may include a display screen on which the event information provided by the one or more processors may be displayed, may include an emergency LED which may be triggered by the one or more processors to blink in a specific manner according to a specific event type (e.g., emergency event, etc.), may include a siren buzzer which may be triggered by the one or more processors to produce sounds in a specific manner according to the specific event type, and the like.

Figure 13:
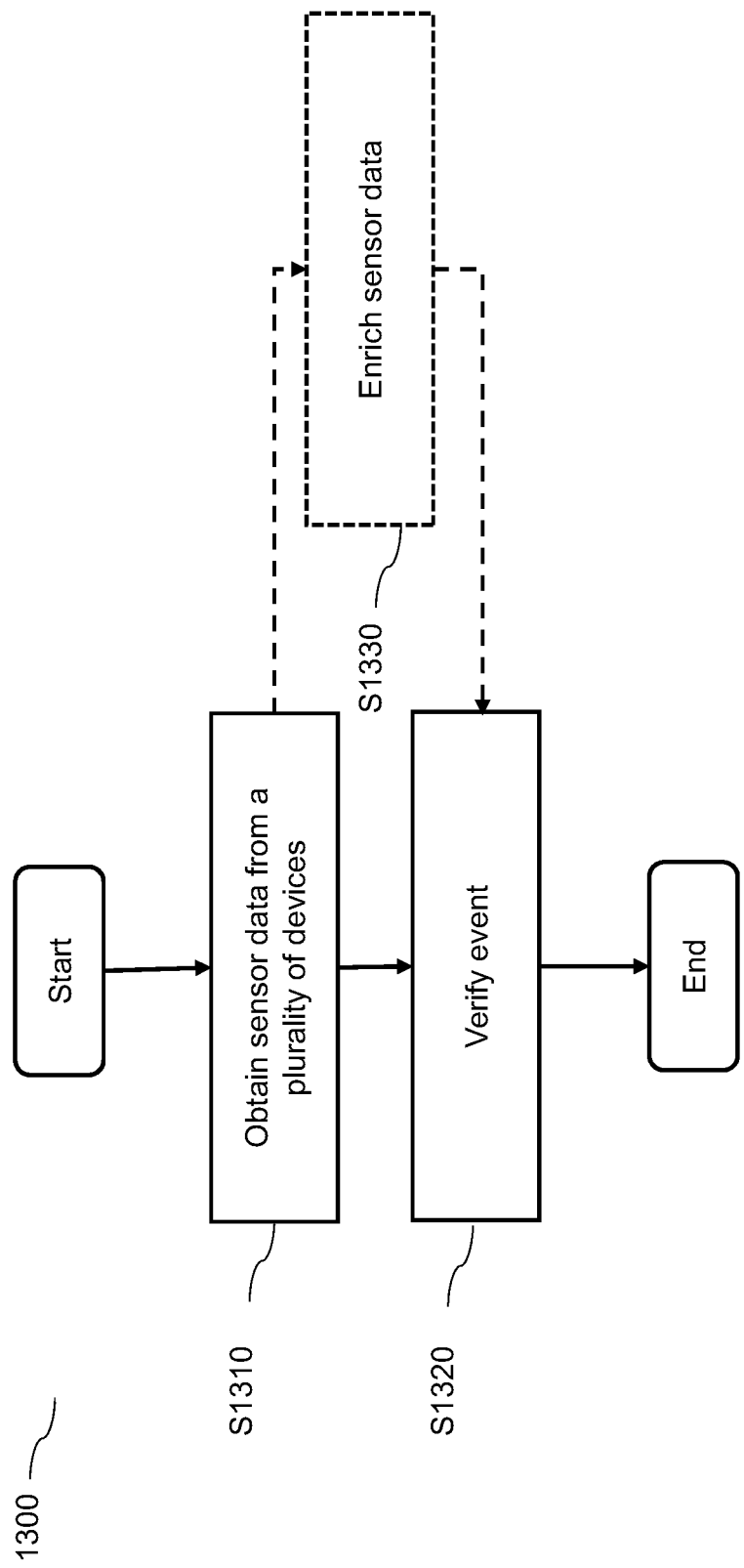
FIG. 13 illustrates a flow diagram of a method for further processing the received sensor data, according to one or more embodiments.

Referring next to FIG. 13, which illustrates a flow diagram of a method 1300 for further processing the received sensor data, according to one or more embodiments. One or more operations of method 1300 may be part of optional operation S1030 in FIG. 10, and may be performed by the one or more processor of the server.

As illustrated in FIG. 13, at operation S1310, the server may obtain sensor data from a plurality of devices. For instance, in addition to the vehicle(s) from which the sensor data is received (may be referred to as "source vehicle" herein), the server (or the one or more processors associated therewith) may obtain, from one or more additional vehicles and/or one or more additional servers, sensor data corresponding to the event associated with the sensor data provided by the source vehicle.

That is, the server may utilize plural sensor data from plural devices (e.g., vehicles, servers, etc.) to verify, analyze, understand, or decipher a particular event. For example, if a predetermined event is detected by a single vehicle (e.g., high G-forces or a pedestrian walking on the middle of the road, etc.), this may not be sufficiently indicative of the event (e.g., earthquake or highly intoxicated individual, etc.) or indicative of the event with a sufficient confidence. If, however, a predetermined number of devices detect the event (e.g., if a predetermined number of devices capture high G-forces) or if the event is detected for a predetermined period of time (e.g., a pedestrian walking on the middle of the road for more than 1 minute), the event may be verified or confirmed by the server.

Example embodiments of the server obtaining sensor data from a plurality of devices are described below with reference to FIG. 14 to FIG. 15.

Referring first to FIG. 14, which illustrates a block diagram of an operation for obtaining sensor data from a plurality of vehicles, according to one or more embodiments. As illustrated in FIG. 14, server 1 may be communicatively coupled to a plurality of vehicles (vehicle A and vehicle B) and may be configured to obtain sensor data associated with an event 1 from the plurality of vehicles.

For instance, server 1 may first receive sensor data from vehicle A, wherein the sensor data indicates that a car accident has occurred. In this regard, before initiating contact with one or more associated authorities, server 1 may determine one or more associated vehicles which are able to provide the associated sensor data (e.g., vehicle located at or nearby the event location at the event time, etc.) and may obtain the associated sensor data such as image data, audio data, temperature data, and the like, from the one or more associated vehicles. In the example illustrated in FIG. 14, server 1 may determine that vehicle B is able to provide the associated sensor data, and may obtain the associated sensor data from vehicle B for further processing.

Referring next to FIG. 15, which illustrates a block diagram of an operation for obtaining sensor data from a vehicle and another server, according to one or more embodiments. As illustrated in FIG. 15, server 1 may be communicatively coupled to the vehicle A and a server 2, and may be configured to obtain sensor data associated with an event 1 from the vehicle A and the server 2.

Similar with the example use case discussed above with reference to FIG. 14, server 1 may first receive sensor data from vehicle A, wherein the sensor data indicates that a car accident has occurred. In this regard, instead of or in addition to obtaining the associated sensor data from one or more other vehicles as described above with reference to FIG. 14, server 1 may obtain the associated sensor data from the server 2. The server 2 may be another server utilized for obtaining sensor data from one or more vehicles and for managing the sensor data (e.g., further processing the sensor data, reporting event information to authority(s), etc.).

Referring back to FIG. 13, upon obtaining sensor data from the plurality of devices at operation S1310, the server may verify an event at operation S1320. For instance, the one or more processors of the server may determine, based on the sensor data provided by the plurality of devices, whether the event indicated in the sensor data and/or event information provided by the source vehicle is accurate (e.g., whether the event has really occurred, whether any incident is missed/undetected by the source vehicle, etc.). The server may perform any appropriate operations, such as comparing the sensor data obtained from the plurality of devices with the sensor data obtained from the source vehicle, and the like, to verify the event.

Accordingly, based on determining that the event is accurate (e.g., the event has actually happened, the event does not include inaccurate incident or does not have undetected incident, etc.), the server may initiate a contact with the associated authority(s), as described above with reference to FIG. 10 to FIG. 12. Conversely, based on determining that the event is not accurate, the server may perform correction on the event information before initiate the contact with the associated authority(s), or may simply not initiate the contact with the associated authority(s).

Referring still to FIG. 13, upon obtaining sensor data from the plurality of devices at operation S1310 and prior to verifying the event at operation S1320, the server may perform an optional operation S1330 to enrich the obtained sensor data.

For instance, the one or more processors may supplement any missing sensor data and/or event information, may perform correction and/or adjustment on the sensor data, may perform noise cancelling operation on low quality sensor data, and the like.

In view of the above, examples embodiments of the present disclosure provide methods and systems for utilizing onboard devices in vehicles to automatically detect events that may require attention from authority(s). Further, upon detecting an event, methods and systems of the example embodiments may automatically detect the associated authority(s) and initiate a contact with the associated authority(s) to report the event. Furthermore, methods and systems of the example embodiments may verify whether an event is accurately detected, before reporting the event to the authorities.

Ultimately, example embodiments of the present disclosure provide efficient and effective identification and reporting of events. For instance, identification and reporting of events may occur with less delay than human identification and reporting. Further, events that are not detected or detectable by a human and/or a single vehicle can be effectively and automatically detected. Furthermore, events may be confirmed or detected with higher accuracy, which in turns reduce the rate of false alarm or fake reporting, and thereby conserve resources of authorities.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer-readable medium at any possible technical detail level of integration. Further, one or more of the above components described above may be implemented as instructions stored on a computer readable medium and executable by at least one processor (and/or may include at least one processor). The computer-readable medium may include a computer-readable non-transitory storage medium (or media) having computer-readable program instructions thereon for causing a processor to carry out operations.

The computer readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming languages such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or another device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer-readable media according to various embodiments. In this regard, each block in the flowchart or block diagrams may represent a module, segment, or portion of instructions, which comprises one or more executable instructions for implementing the specified logical function(s). The method, computer system, and computer-readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

What is claimed is:

1. A method, implemented by programmed one or more processors in a vehicle, comprising:
    obtaining sensor data, continuously and in real-time, from at least one sensor device on the vehicle;
    processing the obtained sensor data to determine whether a predetermined event outside of the vehicle has occurred;
    based on the predetermined event being determined to have occurred, immediately transmitting information corresponding to the predetermined event to a server; and
    automatically contacting, by the server, one or more authorities based on the information corresponding to the predetermined event,
    wherein the obtained sensor data comprises infrared image data, and
    wherein the processing the obtained sensor data comprises determining whether the infrared image data includes an object with a temperature greater than a predetermined threshold.

2. The method according to claim 1, wherein the transmitted information comprises the obtained sensor data.

3. The method according to claim 1, wherein the processing the obtained sensor data comprises inputting a predetermined sequence of the obtained sensor data to a machine learning model trained to detect the predetermined event.

4. The method according to claim 1, wherein the obtained sensor data further comprises at least one of image data, LiDAR sensor data, accelerometer data, and audio data.

5. The method according to claim 1, wherein:
    the obtained sensor data comprises audio data; and
    the processing the obtained sensor data comprises determining whether the audio data includes a predetermined keyword or is louder than a predetermined threshold.

6. The method according to claim 1, wherein:
    the object is a vehicle-shaped object.

7. The method according to claim 1, wherein:
    the obtained sensor data comprises LiDAR sensor data; and
    the processing the obtained sensor data comprises determining whether a collision between a vehicle and a pedestrian occurs based on the LiDAR sensor data.

8. The method according to claim 1, wherein the transmitting the information comprises transmitting the information to the server configured to determine or confirm the event has occurred based on sensor data received from a plurality of vehicles.

9. The method according to claim 1, wherein the transmitting the information comprises transmitting other sensor data, distinct from the obtained sensor data processed to determine the predetermined event, to the server based on the predetermined event being determined to have occurred.

10. The method according to claim 1, wherein the processing the obtained sensor data comprises processing the obtained sensor data, obtained from a plurality of sensor devices, to determine whether the predetermined event has occurred.

11. The method according to claim 10, wherein the plurality of sensor devices comprises sensor devices for detecting data external to the vehicle and for detecting data internal to the vehicle.

12. The method according to claim 1, wherein the processing the obtained sensor data comprises inputting the obtained sensor data to a plurality of event detection modules to determine whether the predetermined event has occurred.

13. A vehicle comprising:
at least one sensor device;
a memory storing instructions; and
at least one programmed processor configured to execute the instructions to:
obtain sensor data, continuously and in real-time, from the at least one sensor device;
process the obtained sensor data to determine whether a predetermined event outside of the vehicle has occurred;
based on the predetermined event being determined to have occurred, immediately transmit information corresponding to the predetermined event to a server;
automatically contact one or more authorities based on the information corresponding to the predetermined event,
wherein the sensor data comprises infrared image data, and
wherein the at least one programmed processor is further configured to execute the instructions to determine whether the infrared image data includes an object with a temperature greater than a predetermined threshold.

14. The vehicle according to claim 13, wherein the transmitted information comprises the obtained sensor data.

15. The vehicle according to claim 13, wherein the at least one programmed processor is configured to execute the instructions to process the obtained sensor data by inputting a predetermined sequence of the obtained sensor data to a machine learning model trained to detect the predetermined event.

16. The vehicle according to claim 13, wherein the obtained sensor data comprises at least one of image data, LiDAR sensor data, accelerometer data, and audio data.

17. The vehicle according to claim 13, wherein the obtained sensor data comprises audio data; and wherein the at least one programmed processor is configured to execute the instructions to process the obtained sensor data by determining whether the audio data includes a predetermined keyword or is louder than a predetermined threshold.

18. The vehicle according to claim 13, wherein the object is a vehicle-shaped object.

19. The vehicle according to claim 13, wherein the obtained sensor data comprises LiDAR sensor data; and wherein the at least one programmed processor is configured to execute the instructions to process the obtained sensor data by determining whether a collision between a vehicle and a pedestrian occurs based on the LiDAR sensor data.

20. The vehicle according to claim 13, wherein the at least one programmed processor is configured to execute the instructions to transmit the information by transmitting the information to the server configured to determine or confirm the event has occurred based on sensor data received from a plurality of vehicles.

* * * * *